(12) United States Patent
Liu

(10) Patent No.: US 7,052,634 B2
(45) Date of Patent: May 30, 2006

(54) METHOD FOR MAKING A FOAM SHEET HAVING VENTILATION HOLES

(76) Inventor: Kun-Chung Liu, No. 5, Alley 9, Lane 212, San-Feng Rd., Hou-Li Hsiang, Taichung Hsien (TW)

( * ) Notice: Subject to any disclaimer, the term of this patent is extended or adjusted under 35 U.S.C. 154(b) by 221 days.

(21) Appl. No.: 10/750,943

(22) Filed: Jan. 5, 2004

(65) Prior Publication Data

US 2005/0146068 A1 Jul. 7, 2005

(51) Int. Cl.
*B29C 44/02* (2006.01)

(52) U.S. Cl. ............... 264/54; 264/51; 264/55; 264/154; 264/155; 264/156; 264/157; 264/DIG. 5

(58) Field of Classification Search ............ 264/51, 264/55, 154, 155, 156, 54, 157, DIG. 5
See application file for complete search history.

(56) References Cited

U.S. PATENT DOCUMENTS 3,975,491 A * 8/1976 Kramer ............... 264/255
4,486,372 A * 12/1984 Millard et al. ........... 264/137
4,526,827 A * 7/1985 Stoll et al. .............. 428/137
5,451,356 A * 9/1995 Hebert .................. 264/163
6,103,163 A * 8/2000 Joppen et al. .......... 264/210.2
6,439,536 B1 * 8/2002 Piccolo ................. 249/63
6,533,880 B1 * 3/2003 van Manen ............. 156/156

* cited by examiner

*Primary Examiner*—Allan R. Kuhns
(74) *Attorney, Agent, or Firm*—Morgan, Lewis & Bockius LLP

(57) ABSTRACT

A method for making a foam sheet having ventilation holes includes the steps of: (a) preparing first and second molds, each including lower and upper mold parts separably closed to each other so as to define first and second mold cavities for the first and second molds, respectively, and providing the second mold with a plurality of pins extending into the second mold cavity, the second mold cavity being larger than the first mold cavity; (b) placing a foamable blank into the first mold cavity; (c) foaming the blank in the first mold cavity; (d) placing the blank foamed in step (c) into the second mold cavity, and piercing the blank through the use of the pins; and (e) foaming the blank to form a foam product within the second mold cavity while being pierced by the pins.

8 Claims, 7 Drawing Sheets

METHOD FOR MAKING A FOAM SHEET HAVING VENTILATION HOLES

BACKGROUND OF THE INVENTION

1. Field of the Invention

The invention relates to a method for making a foam sheet, more particularly to a method for making a foam sheet having ventilation holes.

2. Description of the Related Art

A foam sheet made of polyurethane is formed with a plurality of holes spontaneously after foaming. Therefore, the insole made therefrom has good ventilation. However, polyurethane is a relatively expensive material for the insole. Another kind of foam sheet for the insole is made of ethylene-vinyl acetate copolymer (EVA), which is relatively inexpensive as compared to polyurethane. However, the foam sheet made of EVA is not formed with ventilation holes after foaming. Therefore, additional processing is required to provide the ventilation holes for the foam sheet made of EVA. As shown in FIG. 1, a conventional method for making a foam sheet having ventilation holes is shown to include the steps of preparing a mold having an upper mold part 1 and a lower mold part 2 provided with a mold cavity 201; closing the upper and lower mold parts 1, 2 and inputting an EVA blank 3 into the mold cavity 201, such as by overflowing or injecting; foaming and crosslinking the EVA blank 3 by heating and pressurizing; opening the mold and permitting the EVA blank 3 to expand continuously outside the mold to form a foam body 4; slicing and dividing the foam body 4 into a plurality of foam sheets 5; and piercing each of the foam sheets 5 through use of a solid pin 6 or a hollow pin 7 to form each foam sheet 5 with a plurality of ventilation holes 501.

Although the aforesaid method can provide the foam sheet 5 with the ventilation holes 501, it has the following shortcomings:

1. When the foam sheet 5 is pierced by the solid pin 6, the elasticity of portions of the foam sheet 5 near the ventilation holes 501 may be reduced due to the punching action of the solid pin 5.

2. Waste 502 of the foam sheet 5 as a result of removal by the hollow pin 7 can not be reused.

3. When the EVA blank 3 is foamed and crosslinked by heating, the portion of the EVA blank 3 distal from the mold has a slower reaction time as compared to the portion of the EVA blank 3 proximate to the mold. It is required to lengthen the reaction time so as to complete the foaming and crosslinking of the EVA blank 3. Therefore, a large amount of energy is required to complete the foaming of the EVA blank 3.

4. The ventilation holes 501 formed by the piercing of the solid pin 6 or the hollow pin 7 will result in scratches at the annular surfaces thereof due to the punching of the solid pin 6 or the hollow pin 7.

SUMMARY OF THE INVENTION

Therefore, the object of the present invention is to provide a method for making a foam sheet having ventilation holes, which will provide the foam sheet with the ventilation holes spontaneously after foaming, which is relatively efficient in terms of energy and blank usage, and which enhances the quality of the foam sheet product.

In one aspect of this invention, the method for making a foam sheet having ventilation holes according to this invention includes the steps of: (a) preparing first and second molds, each of which includes lower and upper mold parts separably closed to each other so as to define first and second mold cavities for the first and second molds, respectively, and providing the second mold with a plurality of pins extending into the second mold cavity, the second mold cavity of the second mold being larger than the first mold cavity of the first mold; (b) placing a foamable blank into the first mold cavity of the first mold; (c) foaming the blank in the first mold cavity; (d) placing the blank foamed in step (c) into the second mold cavity, and piercing the blank through the use of the pins; and (e) foaming the blank to form a foam product within the second mold cavity while being pierced by the pins.

In another aspect of this invention, the method for making a foam sheet having ventilation holes according to this invention includes the steps of: (a) preparing a mold including lower and upper mold parts separably closed to each other so as to define a mold cavity, and providing the mold with a plurality of pins extending into the mold cavity; (b) placing a foamable blank into the mold cavity of the mold, and piercing the blank through the use of the pins; and (c) foaming the blank to form a foam product in the mold cavity of the mold while piercing the blank.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
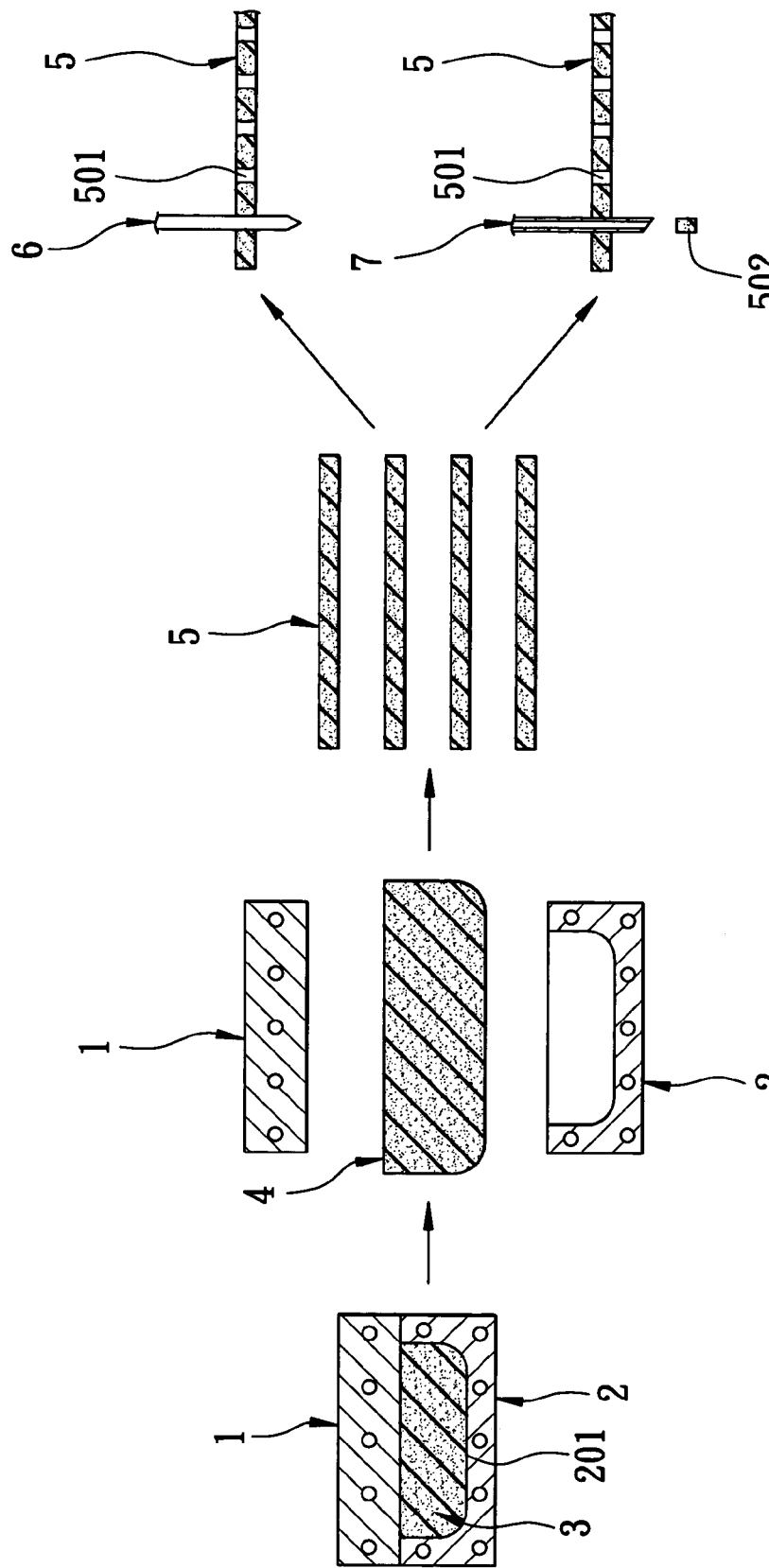
FIG. 1 is a schematic sectional flow diagram of a conventional method for making a foam sheet having ventilation holes.
Figure 2:
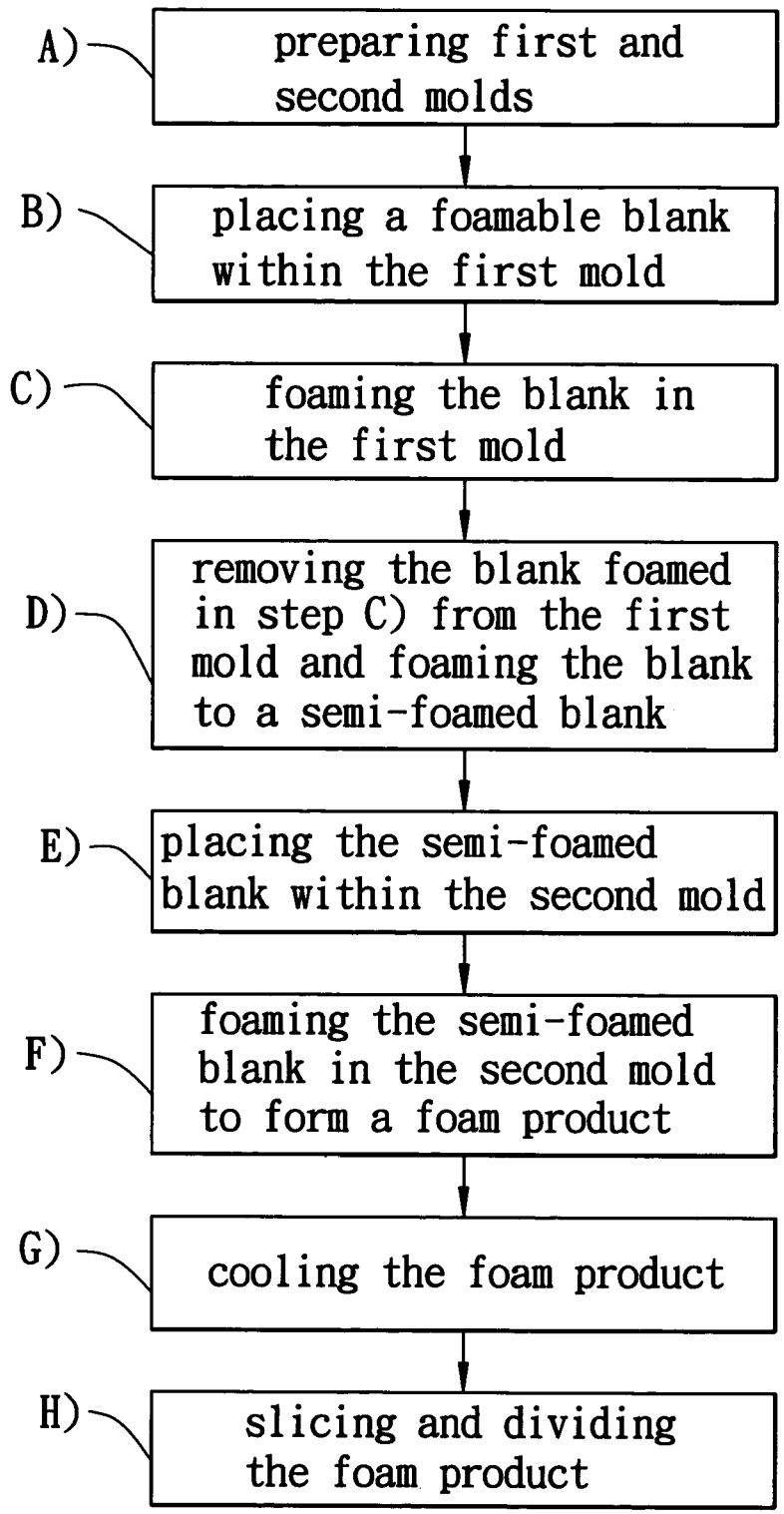
FIG. 2 is a flow diagram of the first preferred embodiment of a method for making a foam sheet having ventilation holes according to this invention.
Figure 3:
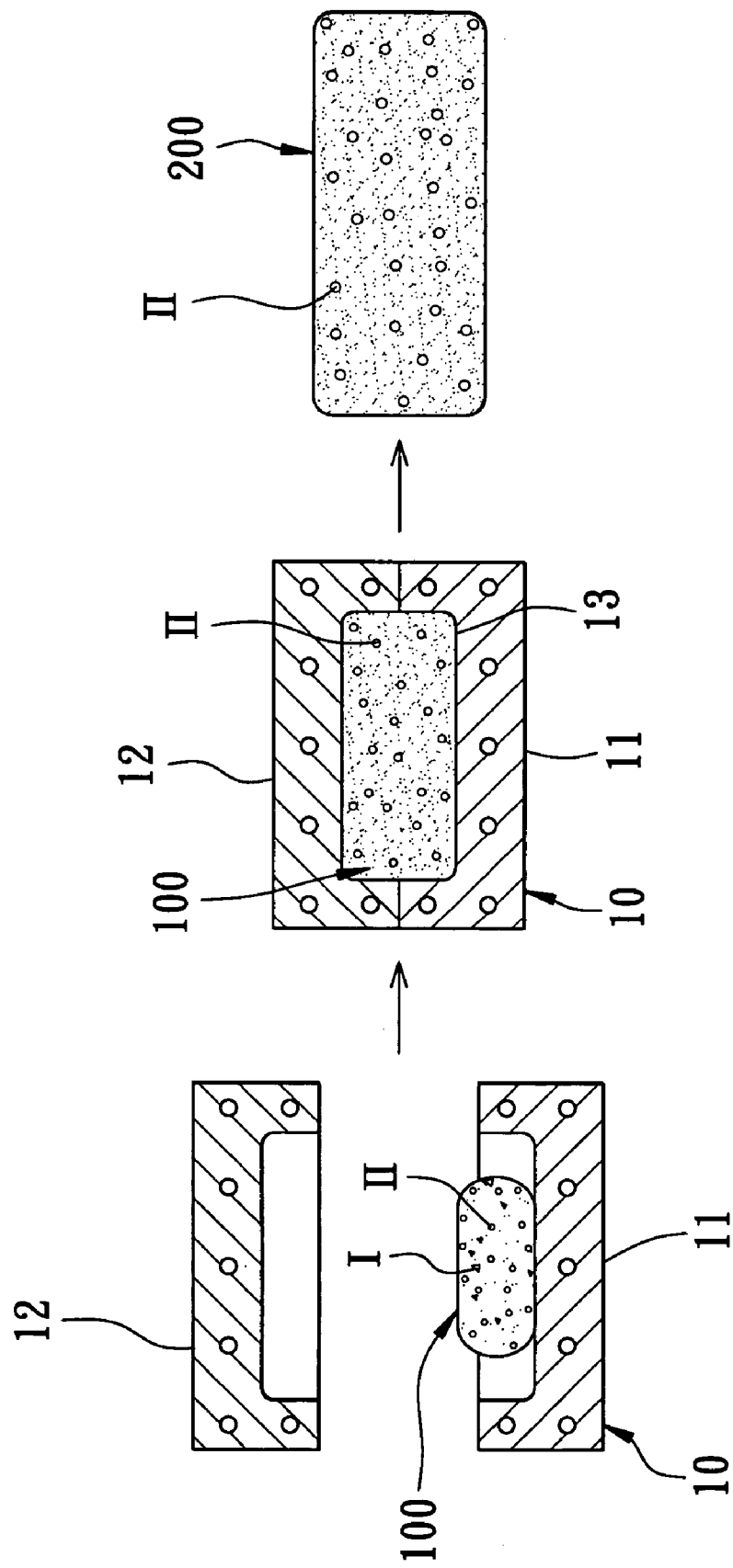
FIGS. 3, 4 and 5 are schematic sectional flow diagrams of the first preferred embodiment.
Figure 4:
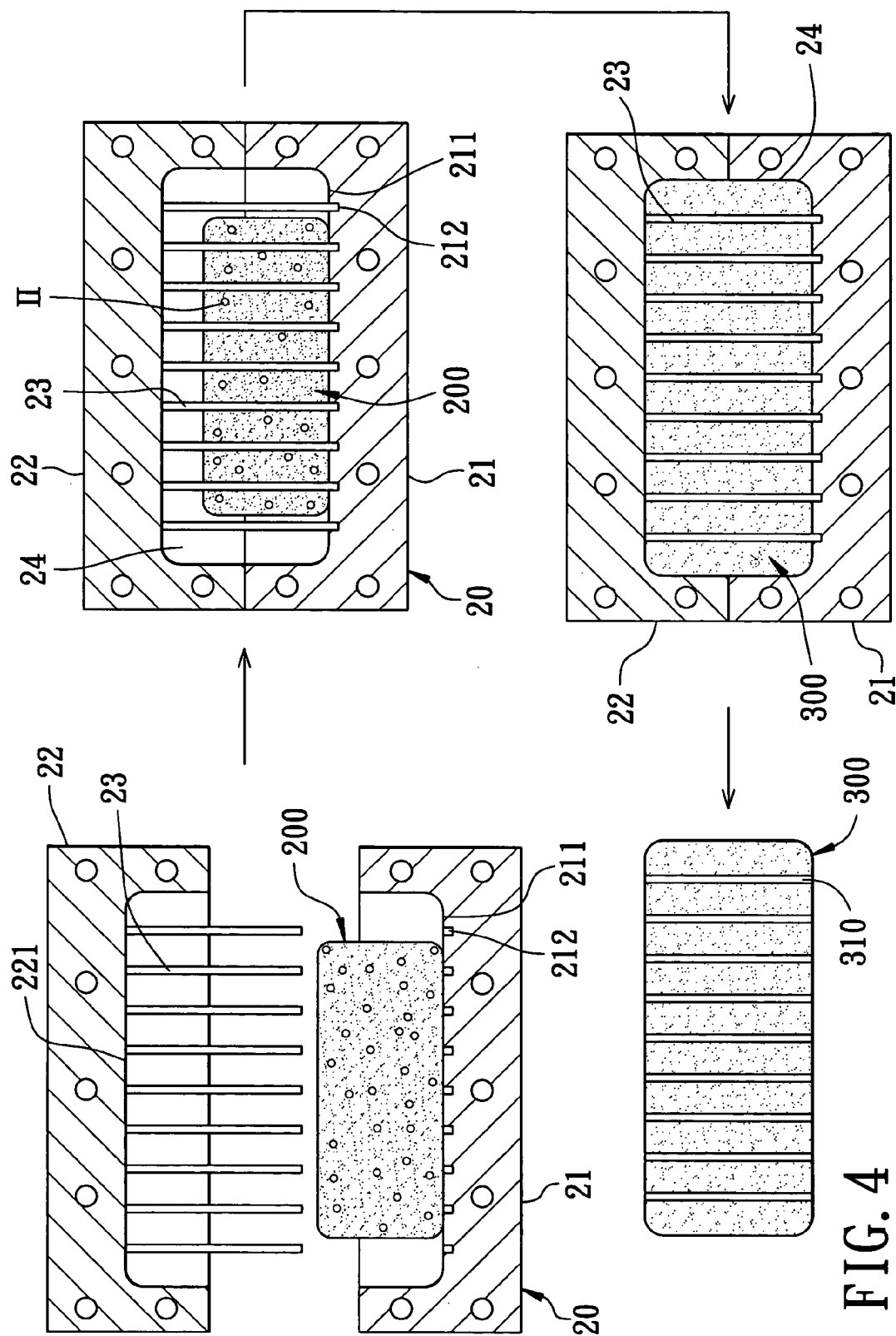
Figure 5:
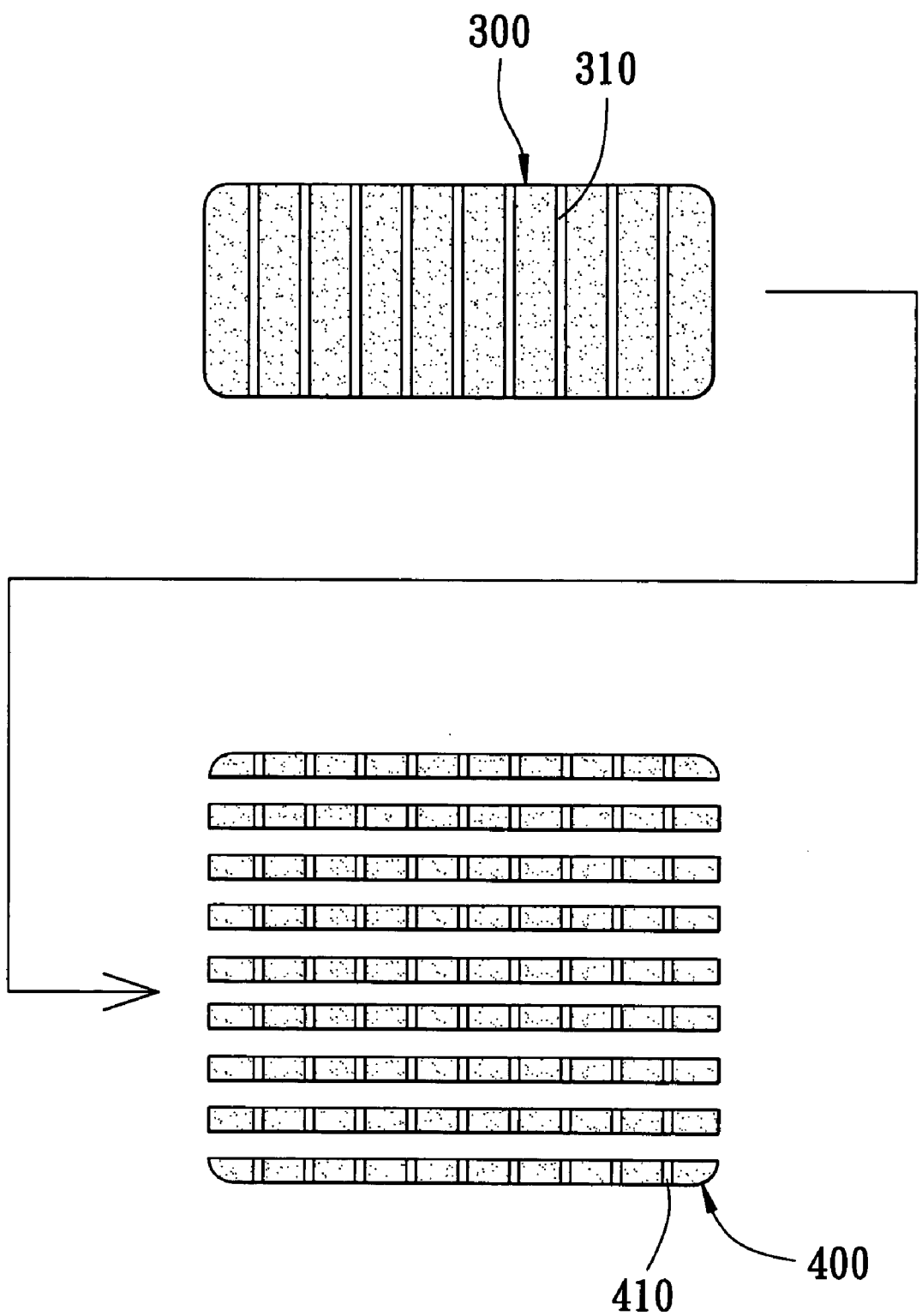

Referring to FIGS. 2, 3, 4 and 5, the first preferred embodiment of the method for making a foam sheet 400 having ventilation holes 410 according to this invention includes the steps of:

A) preparing first and second molds:

As shown in FIG. 3, the first mold 10 includes lower and upper mold parts 11, 12 separably closed to each other so as to define a first mold cavity 13 for the first mold 10. As shown in FIG. 4, the second mold 20 includes lower and upper mold parts 21, 22 separably closed to each other so as to define a second mold cavity 24 for the second mold 20. The second mold 20 is further provided with a plurality of pins 23 extending into the second mold cavity 24. In this preferred embodiment, the pins 23 extend downwardly from the inner top surface 221 of the upper mold part 22 of the second mold 20, whereas the lower mold part 21 of the second mold 20 is provided with a plurality of recesses 212 in the inner bottom surface 211 thereof corresponding to the pins 23 for anchoring the pins 23 therein, respectively.

Furthermore, the second mold cavity 24 of the second mold 20 is larger than the first mold cavity 13 of the first mold 10.

B) placing a foamable blank within the first mold:

As shown in FIG. 3, the foamable blank 100 is placed into the first mold cavity 13 of the first mold 10. In this preferred embodiment, the foamable blank 100 is composed of EVA as a primary component, and first and second foaming agents (I), (II). The first foaming agent (I) has a first foaming temperature. The second foaming agent (II) has a second foaming temperature higher than the first foaming temperature of the first foaming agent (I).

C) foaming the blank within the first mold:

The first mold 10 is heated to a temperature between the first and second foaming temperatures so as to permit the first foaming agent (I) to react in the first mold cavity 13 of the first mold 10 and to initiate foaming of the blank 100. At this time, the second foaming agent has yet to react since the temperature in the first mold cavity 13 of the first mold 10 is lower than the second foaming temperature of the second foaming agent (II).

D) removing the blank foamed in step C) from the first mold:

When the first foaming agent (I) has reacted completely, the first mold 10 is opened, and the blank 100 foamed in step C) is removed from the first mold cavity 13. The blank 100 expands continuously outside the first mold cavity 13 due to the elevated temperature thereof to form a semi-foamed blank 200.

E) placing the semi-foamed blank within the second mold:

As shown in FIG. 4, the semi-foamed blank 200 is placed into the lower mold part 21 of the second mold 20 before it solidifies due to cooling. The upper mold part 22 of the second mold 20 is then closed to the lower mold part 21 of the second mold 20 so as to pierce the semi-foamed blank 200 through the use of the pins 23.

F) foaming the blank in the second mold to form a foam product:

The second mold 20 is heated to the second foaming temperature of the second foaming agent (II) so as to permit the second foaming agent (II) to react in the second mold cavity 24 of the second mold 20 and to foam the semi-foamed blank 300 to form a foam product 300 within the second mold cavity 24 while being pierced by the pins 23.

G) cooling the foam product:

The foam product 300 formed within the second mold cavity 24 is cooled so as to solidify the foam product 300. The second mold 20 is then opened, and the foam product 300 is removed from the second mold 20.

H) slicing and dividing the foam product:

The foam product 300 having a plurality of through-holes 310 is sliced and divided into a plurality of foam sheets 400 having a plurality of ventilation holes 410.

In view of the foregoing, the method of this invention can achieve the following advantages over the prior art:

(1) Since the blank 200 is foamed to form the foam product 300 within the second mold cavity 24 while being pierced by the pins 23, the foam product 30 is formed with a plurality of through-holes 310 simultaneously. Additional punching processing is not required after the foam product is formed. Therefore, the shortcomings of the prior art in respect to waste and scratches at the ventilation holes can be overcome.

(2) Since the second mold 20 is provided with a plurality of pins 23, the heat can be conducted to the blank 200 via the pins 23 when the second mold 20 is heated. Therefore, the energy and the reaction time required to foam the blank 200 when forming the foam product 300 can be reduced.

Figure 6:
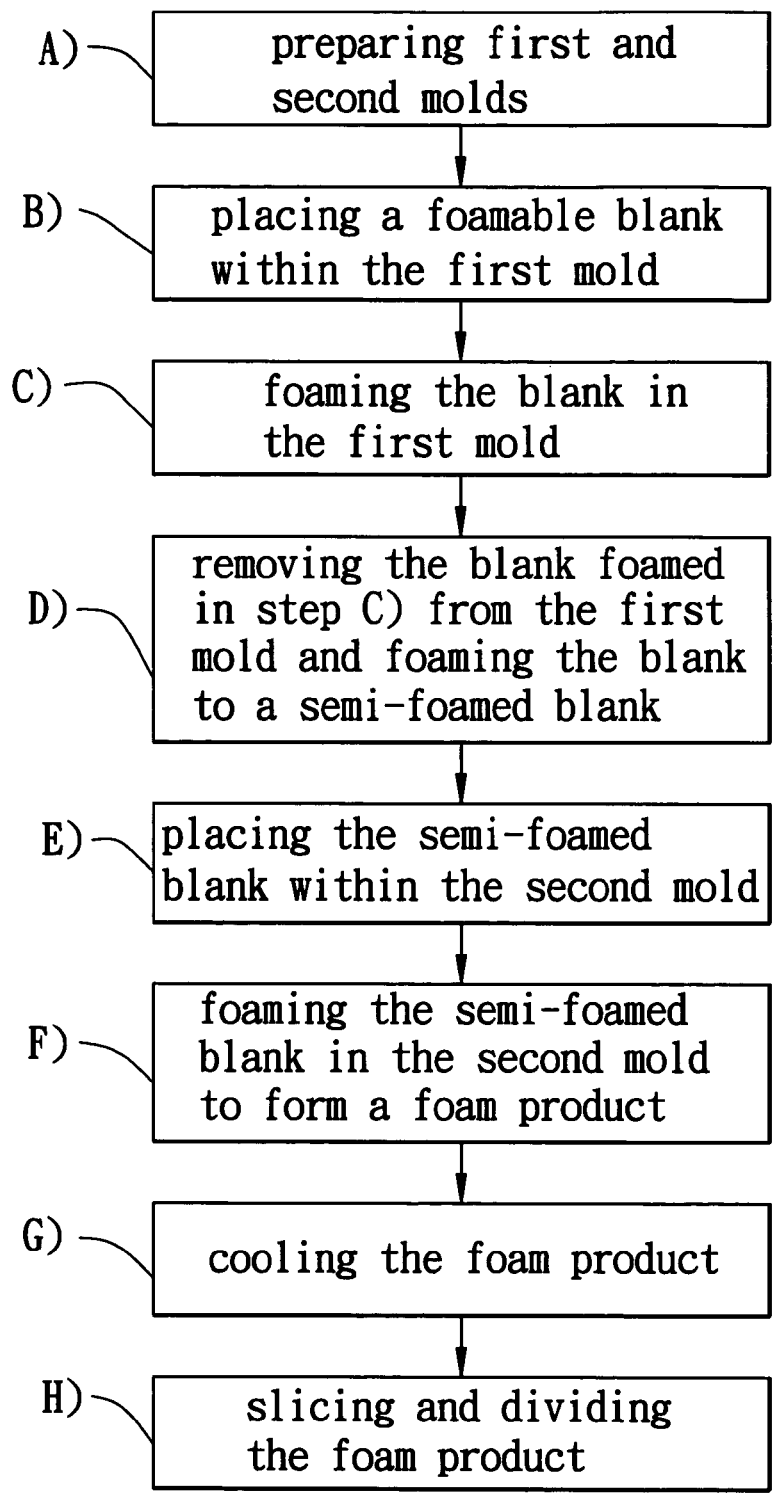
FIG. 6 is a flow diagram of the second preferred embodiment of a method for making a foam sheet having ventilation holes according to this invention.

Referring to FIG. 6, the second preferred embodiment of the method according to this invention is shown to be similar to the first preferred embodiment, except that the foamable blank merely includes a foaming agent, rather than two different foaming agents, and that the foaming agent undergoes a foaming reaction initiated in the first mold cavity of the first mold and finished in the second mold cavity of the second mold.

Figure 7:
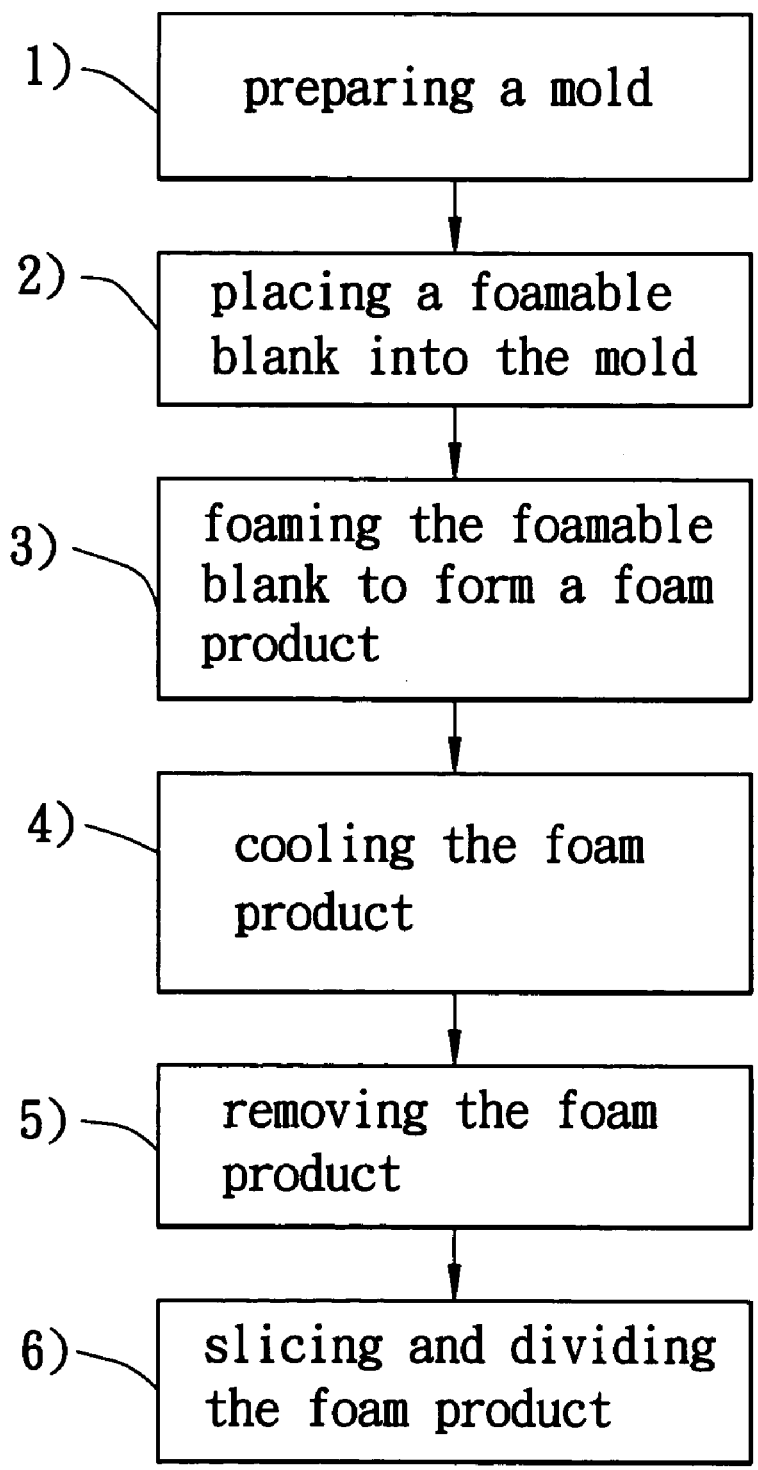
FIG. 7 is a flow diagram of the third preferred embodiment of a method for making a foam sheet having ventilation holes according to this invention.

Referring to FIG. 7, the third preferred embodiment of the method according to this invention is shown to include the steps of:

1) preparing a mold:

The mold includes lower and upper mold parts separably closed to each other so as to define a mold cavity. The mold is further provided with a plurality of pins extending into the mold cavity.

2) placing a foamable blank into the mold:

A foamable blank is placed into the mold cavity of the mold, and is pierced through the use of the pins.

3) foaming the foamable blank to form a foam product:

The foamable blank is foamed to form a foam product having a plurality of through-holes in the mold cavity of the mold while piercing the foamable blank.

4) cooling the foam product:

The foam product is cooled in the mold cavity of the mold.

5) removing the foam product:

The foam product after cooling is removed from the mold cavity of the mold.

6) slicing and dividing the foam product:

The foam product is sliced and divided into a plurality of foam sheets having a plurality of ventilation holes.

In addition to EVA, other materials customarily used in the art, such as styrene butadiene rubber or acrylonitrile butadiene rubber, can be used as the primary component of the foamable blank. Furthermore, in addition to the insole, the foam sheet made by the method of the present invention can be used in other applications, such as a cushion mounted within a shoulder strap of a back-pack, a shoulder pad for garments, a filler for a knee protector, and the like.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A method for making a foam sheet having ventilation holes, comprising the steps of:

(a) preparing first and second molds, each of which includes lower and upper mold parts separably closed to each other so as to define first and second mold cavities for said first and second molds, respectively, and providing said second mold with a plurality of pins extending into said second mold cavity, said second mold cavity of said second mold being larger than said first mold cavity of said first mold;

(b) placing a foamable blank into said first mold cavity of said first mold;

(c) foaming said blank in said first mold cavity;

(d) placing said blank foamed in step (c) into said second mold cavity, and piercing said blank through use of said pins; and (e) foaming said blank to form a foam product within said second mold cavity while being pierced by said pins.

2. The method as claimed in claim 1, further comprising a step of removing said blank foamed in step (c) from said first mold cavity and permitting said blank to expand continuously outside said first mold cavity prior to step (d).

3. The method as claimed in claim 1, wherein said blank includes first and second foaming agents, said first foaming agent having a first foaming temperature, said second foaming agent having a second foaming temperature higher than said first foaming temperature of said first foaming agent.

4. The method as claimed in claim 3, wherein said first foaming agent is reactive in said first mold cavity of said first mold, said second foaming agent being reactive in said second mold cavity of said second mold.

5. The method as claimed in claim 1, wherein said foamable blank includes a foaming agent.

6. The method as claimed in claim 5, wherein said foaming agent undergoes a foaming reaction initiated in said first mold cavity of said first mold, and finished in said second mold cavity of said second mold.

7. The method as claimed in claim 1, further comprising a step of cooling said foam product within said second mold.

8. The method as claimed in claim 7, further comprising a step of slicing and dividing said foam product after said step of cooling.

* * * * *